(12) United States Patent  (10) Patent No.: US 8,781,667 B2
Wimmer et al.  (45) Date of Patent: Jul. 15, 2014

(54) NOISE REDUCTION IN MOTOR VEHICLES WITH A HYBRID DRIVE

(71) Applicant: Dr. Ing. h.c. F. Porsche Aktiengesellschaft, Stuttgart (DE)

(72) Inventors: Stefan Wimmer, Neuhausen/Schellbronn (DE); Wolfgang Held, Moensheim (DE); Heiko Mayer, Adelmannsfelden (DE); Thomas Rauner, Blaubeuren (DE)

(73) Assignee: Dr. Ing. H.C. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 13/719,256

(22) Filed: Dec. 19, 2012

(65) Prior Publication Data

US 2013/0158764 A1 Jun. 20, 2013

(30) Foreign Application Priority Data

Dec. 20, 2011 (DE) .......................... 10 2011 056 676

(51) Int. Cl.
*B60L 11/00* (2006.01)

(52) U.S. Cl.
USPC .......................................................... 701/22

(58) Field of Classification Search
USPC .......................................................... 701/22
See application file for complete search history.

(56) References Cited

U.S. PATENT DOCUMENTS

| 7,653,474 | B2 * | 1/2010 | Cawthorne et al. | 701/99 |
| 8,249,768 | B2 * | 8/2012 | Mori et al. | 701/22 |
| 2005/0080523 | A1 | 4/2005 | Bennett et al. | |
| 2005/0256631 | A1 * | 11/2005 | Cawthorne et al. | 701/99 |
| 2013/0035818 | A1 | 2/2013 | Meitinger et al. | |

FOREIGN PATENT DOCUMENTS

| DE | 10 2007 046 584 A1 | 9/2007 |
| DE | 10 2010 014 971 A1 | 4/2010 |
| EP | 1688707 A1 | 8/2006 |

* cited by examiner

*Primary Examiner* — Mary Cheung
*Assistant Examiner* — Anne Mazzara
(74) *Attorney, Agent, or Firm* — Leydig, Voit & Mayer, Ltd.

(57) ABSTRACT

A method for noise reduction in a motor vehicle that has a hybrid drive and includes an internal combustion engine and at least two electric machines including a first electric machine on a front axle of the motor vehicle and a second electric machine on a rear axle of the motor vehicle. The method includes automatically cutting in the at least two electric machines as a function of a required drive torque and an expected noise emission associated with the required drive torque, in a case of sole operation of the internal combustion engine, so as to reduce the load of the internal combustion engine. Torque distribution is carried out variably between the front axle and rear axle of the motor vehicle.

6 Claims, 1 Drawing Sheet

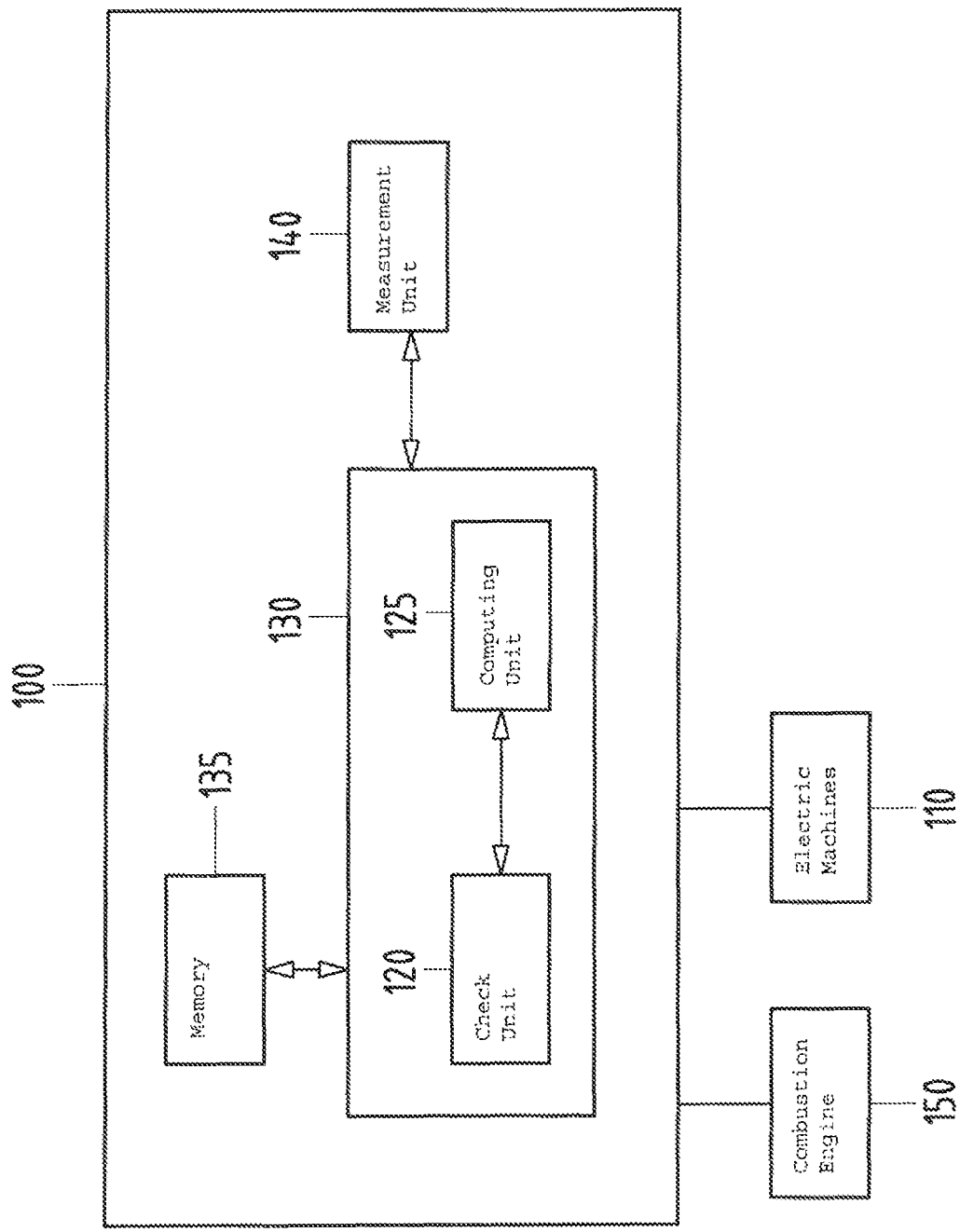

NOISE REDUCTION IN MOTOR VEHICLES WITH A HYBRID DRIVE

CROSS REFERENCE TO RELATED APPLICATIONS

This application claims priority to German Patent Application No. DE 10 2011 056 676.7, filed Dec. 20, 2011, which is hereby incorporated by reference herein in its entirety.

FIELD

The present invention relates to a method and a control unit for noise reduction in a motor vehicle with a hybrid drive. The present invention relates, furthermore, to a corresponding hybrid vehicle.

BACKGROUND

A motor vehicle with a hybrid drive is a motor vehicle which is driven by at least one electric motor and, as a rule, by an internal combustion engine and energy is obtained from a motor vehicle accumulator device for electrical energy and also from a fuel tank. A hybrid vehicle can therefore be driven both solely by the internal combustion engine and solely by the at least one electric motor. Furthermore, however, it is also possible for drive to occur when both the internal combustion engine and the at least one electric motor are in operation.

The internal combustion engine critically influences noise emitted by the motor vehicle. Where high-performance motor vehicles are concerned, it is therefore often necessary to reduce a respective engine power of the internal combustion engine in specific load and rotational speed ranges and, for example, to close any exhaust gas flap valves present, in order to achieve an acceptable noise level or still permissible noise emission in terms of the internal and external noise of the motor vehicle. This is necessary, for example, particularly in urban areas, since increased noise emission is not permissible here. However, such actions upon an engine control of the internal combustion engine, that is to say the closing of exhaust gas flap valves, often lead to a detectable loss in performance of the internal combustion engine of the motor vehicle and, furthermore, to usually increased fuel consumption.

In a vehicle with a hybrid drive, however, on account of the at least one electric motor there are degrees of freedom for influencing the noise emission of the motor vehicle, without having to allow for appreciably detectable performance losses for a respective driver of the motor vehicle.

SUMMARY

In an embodiment, the present invention provides a method for noise reduction in a motor vehicle that has a hybrid drive and includes an internal combustion engine and at least two electric machines including a first electric machine on a front axle of the motor vehicle and a second electric machine on a rear axle of the motor vehicle. The method includes automatically cutting in the at least two electric machines as a function of a required drive torque and an expected noise emission associated with the required drive torque, in a case of sole operation of the internal combustion engine, so as to reduce the load of the internal combustion engine. Torque distribution is carried out variably between the front axle and rear axle of the motor vehicle.

BRIEF DESCRIPTION OF THE DRAWING

Exemplary embodiments of the present invention are described in more detail below with reference to the drawing, in which:

FIG. 1 shows a an embodiment of a control unit according to the invention for a motor vehicle with a hybrid drive.

DETAILED DESCRIPTION

An aspect of the present invention is to utilize in a managed way the degrees of freedom acquired due to electric motors present in a hybrid vehicle, so that permissible noise emission can be obtained.

A method for noise reduction in a motor vehicle with a hybrid drive is proposed, the motor vehicle having an internal combustion engine and at least two electric machines, an electric machine on a front axle and a further electric machine on a rear axle of the motor vehicle. By means of the features of embodiments of the method according to the invention, to lower a noise level the power of the internal combustion engine is reduced, and, if required, this reduced power is automatically boosted to the at least two electric machines, for example as a function of drive torque desired by the driver, in order to compensate the load reduction of the internal combustion engine. The advantage of this is that the power of the drive train is maintained in spite of the reduced noise level. In this case, torque distribution between the front axle and rear axle of the motor vehicle is carried out variably. Torque distribution between the front axle and rear axle of the motor vehicle means in this case that the torques are apportioned to the electric machine on the front axle and to the further electric machine on the rear axle.

Advantageously, when especially quiet operation of the motor vehicle is desired, a corresponding load of the internal combustion engine can be lowered in a managed way and be boosted by the at least two electric machines.

Boosting means that the motor vehicle is driven by positive drive torques from the internal combustion engine and additionally from electric machines. The motor vehicle therefore benefits simultaneously from two drive sources. On the one hand, it is thereby possible to improve the driving performance considerably, as compared with conventional systems, but, on the other hand, an existing performance can also simply be obtained and a combustion engine load can be reduced in a countermove.

What is known as the boosting of power by electric machines in hybrid vehicles is already known. However, by virtue of the method according to the invention, this boosted power is apportioned variably to the at least two electric machines and therefore to the front axle and rear axle, in order thereby to compensate a reduced internal combustion engine load and, furthermore, thus bring about a reduction in noise emission. By torque being apportioned to the front and the rear electric machine, that is to say to the front axle and rear axle of the motor vehicle, a correction of respective noise sources in space and in time is achieved, with the result that a more homogeneous noise behavior and a lower overall noise level are attained.

According to an embodiment of the method according to the invention, for a maximum permissible noise emission, a permissible drive torque associated correspondingly with it is determined for a sole operation of the internal combustion engine and, on the basis of this permissible drive torque, it is automatically established at which respectively required drive torques the at least two electric machines have to be cut in for the load reduction of the internal combustion engine. In this case, there may be provision whereby, on the basis of the maximum permissible noise emission and the permissible drive torque associated with it, a kind of table can be compiled, from which it can be directly derived or read off whether a reduction in noise emission is necessary in the case of a specifically required drive torque and therefore the at least two electric machines have to be cut in for the load reduction of the internal combustion engine.

There may be provision whereby the permissible drive torque corresponding to the maximum permissible noise emission is stored retrievably in a suitable memory of a motor vehicle. The same may apply to an abovementioned and described table, from which it can be directly read off for which respective drive torques a reduction in noise emission is necessary.

Furthermore, there may be provision whereby, when the maximum permissible noise emission is overshot, a cut-in of the at least two electric machines for the load reduction of the internal combustion engine is carried out automatically and torque distribution between the front axle and rear axle of the motor vehicle is carried out variably.

Furthermore, there may be provision whereby uniform torque distribution between the front axle and rear axle of the motor vehicle is carried out, which means that an equal distribution of the apportionable torques to the front axle and rear axle of the motor vehicle takes place. However, a torque distribution deviating from this may also be envisaged, in which case a respectively achieved reduction in noise emission serves as a basis for carrying out managed torque distribution.

The present invention relates, furthermore, to a control unit for a motor vehicle with a hybrid drive, the motor vehicle having an internal combustion engine with at least two electric machines, one electric machine being arranged on a front axle and a further electric machine on a rear axle of the motor vehicle. The control unit according to the invention comprises a check unit which is configured for determining for a required drive torque an expected noise emission associated with it in the case of the sole operation of the internal combustion engine, and, if the noise emission thus determined overshoots a maximum permissible noise emission, for automatically initiating that the at least two electric machines are cut in for the load reduction of the internal combustion engine and torque distribution between the front axle and rear axle of the vehicle is carried out variably.

The determination of the noise emission associated with the required drive torque and to be expected may in this case also mean merely establishing that the noise emission to be expected is higher or lower than the maximum permissible noise emission.

It is possible that the control unit has, furthermore, a computing unit which is configured for determining for the maximum permissible noise emission a permissible drive torque associated correspondingly with it for a sole operation of the internal combustion engine and, on the basis of this permissible drive torque, for automatically establishing at which respectively required drive torques the at least two electric machines have to be cut in for the load reduction of the internal combustion engine. As already mentioned, such establishment may be compiled in the form of a table and be stored retrievably in the motor vehicle.

Furthermore, it is conceivable that the control unit has a measurement unit which is connected communicatively to the check unit and which is configured for continuously measuring noise emissions of the motor vehicle in order to communicate the respectively measured noise emissions to the check unit, the check unit being configured, furthermore, for balancing the respectively measured noise emission with the maximum permissible noise emission.

It is also conceivable that the control unit comprises either alternatively or additionally a further measurement unit which is likewise connected communicatively to the check unit and which is configured for continuously measuring a rotational speed of the motor vehicle or measuring a rotational speed of the corresponding internal combustion engine of the motor vehicle, in order to inform the check unit if a rotational speed in a predetermined rotational speed range is reached which is accompanied by increased noise emission and possibly by noise emission which lies above the maximum permissible noise emission. In this case, the cut-in of the two electric machines can then take place automatically as soon as the rotational speed lies in a predetermined rotational speed range which is associated with noise emission exceeding the permissible noise emission, so that a reduction in noise emission by the internal combustion engine can be brought about very quickly and effectively.

Furthermore, there may be provision for the check unit to optimize torque distribution between the front axle and rear axle of the motor vehicle or between the electric machine on the front axle and the electric machine on the rear axle of the motor vehicle.

Further advantages and refinements of the invention may be gathered from the description and the accompanying drawing.

The invention is illustrated diagrammatically in the drawing by means of embodiments and is described diagrammatically and in detail with reference to the drawing.

In general, a noise level or noise emission of a motor vehicle must be organized in specific ranges such that stipulated limits, that is to say permissible noise emissions, are not overshot. In motor vehicles with a hybrid drive, due to electric machines present there are degrees of freedom for influencing such noise emission. The essential idea of the method according to the invention and of the control unit according to the invention is, then, in a motor vehicle with a hybrid drive, which has an electric machine on the front axle and a further electric machine on the rear axle, to apportion boosted power by the respective electric machines variably to both electric machines and therefore to compensate a correspondingly reduced internal combustion engine load. Apportionment of torques to the front and the rear electric machine gives rise to a correction of responsible noise sources in space and in time, with the result that an overall homogeneous noise behavior and a low noise level or lower noise emission can be implemented.

FIG. 1 shows one possible embodiment of a control unit according to the invention for a motor vehicle with a hybrid drive. FIG. 1 shows a control unit 100 for a motor vehicle with a hybrid drive, the motor vehicle having an internal combustion engine 150 and at least two electric machines, a first electric machine on a front axle and a second electric machine on a rear axle of the motor vehicle. The first electric machine and the second electric machine are designated here in summary by reference symbol 110. The control unit 100 has a check unit 120 which is configured for determining for a drive torque required, for example, by a driver of the motor vehicle an expected noise emission associated with this in the case of a sole operation of the internal combustion engine of the motor vehicle. Furthermore, the check unit 120 is designed, in the event that the noise emission thus determined overshoots a maximum permissible noise emission, for automatically initiating that the at least two electric machines 110 are cut in for the load reduction of internal combustion engine 150 and torque distribution between the front axle and rear axle of the motor vehicle is carried out variably. The control unit has, furthermore, a computing unit 125 which is configured for determining for the maximum permissible noise emission a permissible drive torque correspondingly associated with this for a sole operation of the internal combustion engine and, on the basis of this permissible drive torque, for automatically establishing at which respectively required drive torques the at least two electric machines have to be cut in for the load reduction of the internal combustion engine. The check unit 120 and the computing unit 125 are in communicative contact with one another and can be combined in one unit 130. It is also possible that the check unit does not determine for a required drive torque an expected noise emission associated with it explicitly in the case of the sole operation of the internal combustion engine, but instead merely establishes that, for the required drive torque, expected noise emission associated with it in the case of the sole operation of the internal combustion engine lies above the maximum permissible noise emission and therefore automatically initiates that the at least two electric machines have to be cut in. This means that it is not absolutely necessary to determine explicitly for a respectively required drive torque an expected noise emission associated with it, but merely to establish that the noise emission respectively to be expected lies above the maximum permissible noise emission as a function of the respectively required drive torque. On the basis of the permissible drive torque, the computing unit 125 may prepare a kind of case discrimination, for example in the form of a table which in each retrieval immediately outputs for a respectively specifically required drive torque whether it is necessary to cut in the at least two electric machines for the load reduction of the internal combustion engine. If appropriate, for the maximum permissible noise emission, there are a plurality of permissible drive torques associated correspondingly with it in the case of a sole operation of the internal combustion engine, so that, on the basis of this plurality of permissible drive torques, a kind of range graph can be prepared which provides evidence of which respective drive torques lead in which ranges to noise emission which lies above the maximum permissible noise emission, so that it is necessary to cut in the two electric machines here. This range graph or, alternatively, a kind of table may be stored in a memory 135 of the control unit 100, so that this table is always retrievable. The check unit 120 and the computing unit 125 are in communicative contact with the memory 135 and can have access to the storage contents of the latter and store new storage contents, the latter usually being carried out by the computing unit 125. Furthermore, the control unit comprises a measurement unit 140 which is connected communicatively to the check unit and is configured for continuously measuring the noise emission of the motor vehicle and for communicating the respectively measured noise emission to the check unit, the check unit being configured, furthermore, for balancing the respectively measured noise emission with the maximum permissible noise emission. The measurement unit 140 does not have to be part of the control unit 100, but merely has to be in communicative contact with the check unit 120 of the control unit 100. This means that the measurement unit 140 may also be arranged outside the control unit 100. The control unit 100 is ultimately in communicative contact with the electric machines 110 and also with the internal combustion engine 150 and, via the respective communicative connections, automatically initiates a load reduction of the internal combustion engine 150 when the maximum permissible noise emission is overshot, together with a cut-in of the electric machines 110 and with variable torque distribution to the electric machines 110, in particular uniform torque distribution taking place to the two electric machines, to the first machine arranged on the front axle and to the second machine arranged on the rear axle of the motor vehicle.

It is also conceivable, furthermore, that, additionally or alternatively, a further measurement unit is provided which is configured for continuously determining a rotational speed of the internal combustion engine 150 and for communicating to the control unit or to the check unit 120 contained in it whether the measured rotational speed lies in a rotational speed range, of which it is already known that the rotational speeds of the internal combustion engine which are contained in it are associated respectively with increased noise emission, that is to say noise emission lying above the maximum permissible noise emission. The check unit or control unit can obtain sufficient information on this to initiate that a load reduction of the internal combustion engine 150 associated with a cut-in of the electric machines 110 and, furthermore, torque distribution to the two electric machines are carried out, so that a lower noise emission than the maximum permissible noise emission, in particular a noise emission optimal for the current driving situation, is obtained, without the driver's type of driving or the current driving situation being impaired.

While the invention has been particularly shown and described with reference to preferred embodiments thereof, it will be understood by those skilled in the art that various changes in form and details may be made therein without departing from the spirit and scope of the invention.

The invention claimed is:

1. A method for noise reduction in a motor vehicle with a hybrid drive, the motor vehicle including an internal combustion engine and at least two electric machines including a first electric machine on a front axle of the motor vehicle and a second electric machine on a rear axle of the motor vehicle, the method comprising:
   determining a permissible drive torque associated with a maximum permissible noise emission for a case of sole operation of the internal combustion engine;
   automatically cutting in the at least two electric machines as a function of a required drive torque and an expected noise emission associated with the required drive torque, in the case of sole operation of the internal combustion engine, so as to reduce the load of the internal combustion engine and automatically establish a load reduction of the internal combustion engine that is based on the permissible drive torque associated with the maximum permissible noise emission, and
   carrying out torque distribution variably between the front axle and rear axle of the motor vehicle.

2. The method as recited in claim 1, wherein the permissible drive torque corresponding to the maximum permissible noise emission is stored retrievably in a memory unit of the motor vehicle.

3. The method as recited in claim 1, wherein a cut-in of the at least two electric machines for the load reduction of the internal combustion engine is carried out automatically and torque distribution between the front axle and rear axle of the motor vehicle is carried out variably when the maximum permissible noise emission is overshot.

4. The method as recited in claim 1, wherein uniform torque distribution between the front axle and rear axle of the motor vehicle is carried out.

5. A control unit for a motor vehicle with a hybrid drive, the motor vehicle having an internal combustion engine and at least two electric machines including a first electric machine on a front axle of the motor vehicle and a second electric machine on a rear axle of the motor vehicle, the control unit comprising:
- a check unit configured to determine, for a required drive torque, an expected noise emission associated with the required drive torque in the case of sole operation of the internal combustion engine, and to automatically initiate a cutting in of the at least two electric machines if the determined noise emission overshoots a maximum permissible noise emission so as to reduce a load of the internal combustion engine, and to variably carry out a torque distribution between the front axle and rear axle of the motor vehicle; and
- a computing unit configured to determine a permissible drive torque for the maximum permissible noise emission associated correspondingly with the permissible drive torque for a sole operation of the internal combustion engine and configured to, on the basis of the determined permissible drive torque, automatically establish respective required drive torques at which the at least two electric machines have to be cut in for the load reduction of the internal combustion engine.

6. The control unit as recited in claim 5, further comprising a measurement unit connected communicatively to the check unit and configured to continuously measure the noise emission of the motor vehicle and to communicate the respectively measured noise emission to the check unit, the check unit being configured to balance the respectively measured noise emission with the maximum permissible noise emission.

* * * * *